United States Patent
Thompsett et al.

(10) Patent No.: US 10,297,836 B2
(45) Date of Patent: May 21, 2019

(54) CATALYST LAYER

(75) Inventors: David Thompsett, Reading (GB);
Edward Anthony Wright, Reading (GB); Janet Mary Fisher, Reading (GB); Enrico Petrucco, Reading (GB)

(73) Assignee: Johnson Matthey Fuel Cells Limited, London, England (GB)

( * ) Notice: Subject to any disclaimer, the term of this patent is extended or adjusted under 35 U.S.C. 154(b) by 478 days.

(21) Appl. No.: 13/994,186

(22) PCT Filed: Dec. 14, 2011

(86) PCT No.: PCT/GB2011/052472
§ 371 (c)(1),
(2), (4) Date: Aug. 1, 2013

(87) PCT Pub. No.: WO2012/080726
PCT Pub. Date: Jun. 21, 2012

(65) Prior Publication Data
US 2013/0330651 A1    Dec. 12, 2013

(30) Foreign Application Priority Data

Dec. 16, 2010 (GB) .................................. 1021352.8

(51) Int. Cl.
*H01M 4/86* (2006.01)
*H01M 4/90* (2006.01)
*H01M 8/1018* (2016.01)

(52) U.S. Cl.
CPC ....... *H01M 4/8657* (2013.01); *H01M 4/8647* (2013.01); *H01M 4/9016* (2013.01); *H01M 4/9025* (2013.01); *H01M 4/8652* (2013.01); *H01M 2008/1095* (2013.01)

(58) Field of Classification Search
CPC .... H01M 4/86; H01M 4/8647; H01M 4/8652; H01M 4/8657; H01M 4/9016; H01M 4/92; H01M 4/921; H01M 4/9025; H01M 2008/1095
See application file for complete search history.

(56) References Cited

U.S. PATENT DOCUMENTS

| | | | |
|---|---|---|---|
| 4,124,539 A | 11/1978 | Horowitz et al. | |
| 4,146,458 A * | 3/1979 | Horowitz | C25B 11/04 165/185 |
| 5,616,223 A * | 4/1997 | Shen | B01D 53/228 204/252 |
| 8,329,129 B2 | 12/2012 | Sato et al. | |
| 2007/0248874 A1* | 10/2007 | Aoyama | B01D 67/0072 429/411 |
| 2010/0089745 A1 | 4/2010 | Valdez et al. | |
| 2011/0236794 A1* | 9/2011 | Donet | H01M 4/8621 429/495 |
| 2012/0140378 A1* | 6/2012 | Tan | H01G 11/02 361/500 |
| 2013/0302705 A1* | 11/2013 | Yoshida | H01M 12/08 429/405 |

FOREIGN PATENT DOCUMENTS

| | | | |
|---|---|---|---|
| EP | 0 731 520 A1 | 9/1996 | |
| GB | 2009129 A | 6/1979 | |
| GB | 2 029 385 A | 3/1980 | |
| JP | 54-85195 | 7/1979 | |
| JP | 2006-196329 | 7/2006 | |
| JP | 2010184824 A | 8/2010 | |
| WO | 01/15247 A2 | 3/2001 | |
| WO | 01/59859 A1 | 8/2001 | |
| WO | 2005/020356 A1 | 3/2005 | |
| WO | WO 2010029242 A1 * | 3/2010 | .......... H01M 4/8621 |
| WO | 2011/021034 A1 | 2/2011 | |

OTHER PUBLICATIONS

Saito, Yoshinobu, et al. "Oxygen Reduction Electrode Properties of Pyrochlores Ln2Ru2O7-δ (Ln= Pr, Nd, Sm) in Aqueous Solutions." Key Engineering Materials. vol. 350. Trans Tech Publications, 2007.*
Koga, Kohei, Toshihide Momai, and Morio Matsunaga. "Compositions and Properties of Pyrochlore-Type Oxides for Air Electrode in Secondary Cells." ECS Transactions 11.32 (2008): 101-104.*
Prakash, J., et al. "Investigations of ruthenium pyrochlores as bifunctional oxygen electrodes." Journal of applied electrochemistry 29.12 (1999): 1463-1469. (Year: 1999).*
Bursill, Les A., et al. "Comparison of lead zirconate titanate thin films on ruthenium oxide and platinum electrodes." Journal of applied physics 75.3 (1994): 1521-1525. (Year: 1994).*
International Search Report, dated May 9, 2012, from corresponding PCT application.
GB Search Report dated Apr. 13, 2011, from corresponding GB application.

(Continued)

*Primary Examiner* — Philip A. Stuckey
(74) *Attorney, Agent, or Firm* — BakerHostetler

(57) ABSTRACT

A catalyst layer including an electrocatalyst and an oxygen evolution catalyst, wherein the oxygen evolution catalyst includes a crystalline metal oxide including:

(i) one of more first metals selected from the group consisting of yttrium, lanthanum, cerium, praseodymium, neodymium, promethium, samarium, europium, gadolinium, terbium, dysprosium, holmium, erbium, thulium, ytterbium, lutetium, magnesium, calcium, strontium, barium, sodium, potassium, indium, thallium, tin, lead, antimony and bismuth;

(ii) one or more second metals selected from the group consisting of Ru, Ir, Os and Rh; and (iii) oxygen characterized in that:

(a) the atomic ratio of first metal(s):second metal(s) is from 1:1.5 to 1.5:1

(b) the atomic ratio of (first metal(s)+second metal(s)): oxygen is from 1:1 to 1:2 is disclosed.

6 Claims, No Drawings

(56) References Cited

OTHER PUBLICATIONS

JP Office Action, dated Oct. 13, 2015; Application No. 2013-543878.
Qingsheng et al, - "Neutron Diffraction Studies on $ABO_3$ (A=La, Sr, B=Fe, Co, Ni, Cu, Mn, Ti) perovskite used in solid oxide fuel cell (SOFC) and double perovskite $Ba_2YRu0.85Cu0.15O_6$ Superconductor ", Dissertation presented to Faculty of the Graduate School at the University of Missouri-Columbia, May, 2009.

* cited by examiner

CATALYST LAYER

FIELD OF THE INVENTION

The present invention relates to a catalyst layer, particularly a catalyst layer for use in a fuel cell that experiences high electrochemical potentials.

BACKGROUND OF THE INVENTION

A fuel cell is an electrochemical cell comprising two electrodes separated by an electrolyte. A fuel, such as hydrogen or an alcohol such as methanol or ethanol, is supplied to the anode and an oxidant, such as oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

In proton exchange membrane (PEM) fuel cells, the electrolyte is a solid polymeric membrane. The membrane is electronically insulating but proton conducting, and protons, produced at the anode, are transported across the membrane to the cathode, where they combine with oxygen to form water.

The principal component of a PEM fuel cell is known as a membrane electrode assembly (MEA) and is essentially composed of five layers. The central layer is the polymer ion-conducting membrane. On either side of the ion-conducting membrane there is an electrocatalyst layer, containing an electrocatalyst designed for the specific electrochemical reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

Electrocatalysts for fuel oxidation and oxygen reduction are typically based on platinum or platinum alloyed with one or more other metals. The platinum or platinum alloy catalyst can be in the form of unsupported nanometre sized particles (such as metal blacks or other unsupported particulate metal powders) or can be deposited as even higher surface area particles onto a conductive carbon substrate, or other conductive material (a supported catalyst).

The MEA can be constructed by several methods. The electrocatalyst layer may be applied to the gas diffusion layer to form a gas diffusion electrode. Two gas diffusion electrodes can be placed either side of an ion-conducting membrane and laminated together to form the five-layer MEA. Alternatively, the electrocatalyst layer may be applied to both faces of the ion-conducting membrane to form a catalyst coated ion-conducting membrane. Subsequently, gas diffusion layers are applied to both faces of the catalyst coated ion-conducting membrane. Finally, an MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically tens or hundreds of MEAs are required to provide enough power for most applications, so multiple MEAs are assembled to make up a fuel cell stack. Field flow plates are used to separate the MEAs. The plates perform several functions: supplying the reactants to the MEAs, removing products, providing electrical connections and providing physical support.

High electrochemical potentials can occur in a number of real-life operational situations and in certain circumstances can cause damage to the catalyst layer/electrode structure. Further descriptions of a number of situations where high electrochemical potentials are seen are described below:

(a) Cell Reversal

Electrochemical cells occasionally are subjected to a voltage reversal condition, which is a situation where the cell is forced to the opposite polarity. Fuel cells in series are potentially subject to these unwanted voltage reversals, such as when one of the cells is forced to the opposite polarity by the other cells in the series. In fuel cell stacks, this can occur when a cell is unable to produce, from the desired fuel cell reactions, the current being forced through it by the rest of the cells. Groups of cells within a stack can also undergo voltage reversal and even entire stacks can be driven into voltage reversal by other stacks in an array. Aside from the loss of power associated with one or more cells going into voltage reversal, this situation poses reliability concerns. Undesirable electrochemical reactions may occur, which may detrimentally affect fuel cell components. Component degradation reduces the reliability and performance of the fuel cell, and in turn, its associated stack and array.

A number of approaches have been utilised to address the problem of voltage reversal, for example employing diodes capable of carrying the current across each individual fuel cell or monitoring the voltage of each individual cell and shutting down an affected cell if a low voltage is detected. However, given that stacks typically employ numerous fuel cells, such approaches can be quite complex and expensive to implement.

Alternatively, other conditions associated with voltage reversal may be monitored instead, and appropriate corrective action can be taken if reversal conditions are detected. For instance, a specially constructed sensor cell may be employed that is more sensitive than other fuel cells in the stack to certain conditions leading to voltage reversal (for example, fuel starvation of the stack). Thus, instead of monitoring every cell in a stack, only the sensor cell need be monitored and used to prevent widespread cell voltage reversal under such conditions. However, other conditions leading to voltage reversal may exist that a sensor cell cannot detect (for example, a defective individual cell in the stack). Another approach is to employ exhaust gas monitors that detect voltage reversal by detecting the presence of or abnormal amounts of species in an exhaust gas of a fuel cell stack that originate from reactions that occur during reversal. While exhaust gas monitors can detect a reversal condition occurring within any cell in a stack and they may suggest the cause of reversal, such monitors do not identify specific problem cells and they do not generally provide any warning of an impending voltage reversal.

Instead of, or in combination with the preceding, a passive approach may be preferred such that, in the event that reversal does occur, the fuel cells are either more tolerant to the reversal or are controlled in such a way that degradation of any critical cell components is reduced. A passive approach may be particularly preferred if the conditions leading to reversal are temporary. If the cells can be made more tolerant to voltage reversal, it may not be necessary to detect for reversal and/or shut down the fuel cell system during a temporary reversal period. Thus, one method that has been identified for increasing tolerance to cell reversal is to employ a catalyst that is more resistant to oxidative corrosion than conventional catalysts (see WO01/059859).

A second method that has been identified for increasing tolerance to cell reversal is to incorporate an additional or second catalyst composition at the anode for purposes of electrolysing water (see WO01/15247). During voltage reversal, electrochemical reactions may occur that result in the degradation of certain components in the affected fuel cell. Depending on the reason for the voltage reversal, there can be a significant rise in the absolute potential of the fuel cell anode to a higher potential than that of the cathode. This occurs, for instance, when there is an inadequate supply of fuel (i.e. fuel starvation) to the anode. In this situation the cathode reaction and thus the cathode potential remains unchanged as the oxygen reduction reaction (ORR):

$$\tfrac{1}{2}O_2 + 2H^+ + 2e^- \rightarrow H_2O$$

whereas the normal fuel cell reaction at the anode—the hydrogen oxidation reaction (HOR):

$$H_2 \rightarrow 2H^+ + 2e^-$$

can no longer be sustained and other electrochemical reactions then take place at the anode to maintain the current. These reactions can typically be either water electrolysis—the oxygen evolution reaction (OER):

$$H_2O \rightarrow \tfrac{1}{2}O_2 + 2H^+ + 2e^-$$

or carbon electrochemical oxidation:

$$\tfrac{1}{2}C + H_2O \rightarrow \tfrac{1}{2}CO_2 + 2H^+ + 2e^-$$

Both these reactions occur at a higher absolute potential than the oxygen reduction reaction at the cathode (hence the cell voltage reverses).

During such a reversal in a PEM fuel cell, water present at the anode enables the electrolysis reaction to proceed and the carbon support materials used to support the anode catalyst and other cell components enables the carbon oxidation reaction also to proceed. It is much more preferable to have water electrolysis occur rather than the carbon oxidation reaction. When water electrolysis reactions at the anode cannot consume the current forced through the cell, the rate of oxidation of the carbonaceous anode components increases, thereby tending to irreversibly degrade certain anode components at a greater rate. Thus, by incorporating a catalyst composition that promotes the electrolysis of water, more of the current forced through the cell may be consumed in the electrolysis of water than in the oxidative corrosion of anode components, such as carbon.

A reversal condition can also be experienced due to oxidant starvation on the cathode. However, this is much less detrimental to the cell, because the reaction likely to occur instead of the reduction of the oxidant is that the protons produced at the anode cross the electrolyte and combine with electrons directly at the cathode to produce hydrogen via the hydrogen evolution reaction (HER):

$$2H^+ \rightarrow 2e^- + H_2$$

In this reversal situation the anode reaction and thus the anode potential remain unchanged, but the absolute potential of the cathode drops to below that of the anode (hence the cell voltage reverses). These reactions do not involve potentials and reactions at which significant component degradation is caused.

(b) Start-up Shut-down

For many fuel cells it is also not practical or economic to provide purging of hydrogen from the anode gas space with an inert gas such as nitrogen during shut down. This means that there may arise a mixed composition of hydrogen and air on the anode whilst air is present on the cathode. Similarly, when a cell is re-started after being idle for some time, air may have displaced hydrogen from the anode and as hydrogen is re-introduced to the anode, again a mixed air/hydrogen composition will exist whilst air is present at the cathode. Under these circumstances an internal cell can exist, as described by Tang et al (Journal of Power Sources 158 (2006) 1306-1312), which leads to high potentials on the cathode. The high potentials can cause carbon to oxidise according to the electrochemical carbon oxidation reaction indicated previously:

$$\tfrac{1}{2}C + H_2O \rightarrow \tfrac{1}{2}CO_2 + 2H^+ + 2e^-$$

and this is highly damaging to the structure of the catalyst layer where the catalyst layer contains carbon. If the cathode layer is able to support oxygen evolution by the water electrolysis reaction (OER) however, the high potentials can be used to drive water electrolysis rather than carbon corrosion.

(c) Regenerative Fuel Cells

In regenerative fuel cells the electrodes are bi-functional and both electrodes must support two electrochemical reaction types at different times. When operating as a fuel cell the oxygen electrode must reduce oxygen (ORR) and the hydrogen electrode must oxidise hydrogen (HOR); when operating as an electrolyser the hydrogen electrode must evolve hydrogen (HER) and the oxygen electrode must evolve oxygen (OER).

Electrocatalysts for the water electrolysis reaction are generally based on iridium oxide or iridium oxide mixed with at least one other metal oxide. However, iridium-based catalysts are not sufficiently active at the loadings required in a fuel cell.

It is therefore an object of the present invention to provide a catalyst layer comprising alternative water electrolysis catalysts, which have superior activity to state of the art water electrolysis catalysts for the oxygen evolution reaction, and which demonstrate superior performance when incorporated into a MEA and operated under practical real-life fuel cell operating conditions.

SUMMARY OF THE INVENTION

Accordingly, the present invention provides a catalyst layer comprising an electrocatalyst and an oxygen evolution catalyst, wherein the oxygen evolution catalyst comprises a crystalline metal oxide comprising:

(i) one of more first metals selected from the group consisting of yttrium, lanthanum, cerium, praseodymium, neodymium, promethium, samarium, europium, gadolinium, terbium, dysprosium, holmium, erbium, thulium, ytterbium, lutetium, magnesium, calcium, strontium, barium, sodium, potassium, indium, thallium, tin, lead, antimony and bismuth;

(ii) one or more second metals selected from the group consisting of Ru, Ir, Os and Rh; and (iii) oxygen characterised in that:

(a) the atomic ratio of first metal(s):second metal(s) is from 1:1.5 to 1.5:1

(b) the atomic ratio of (first metal(s)+second metal(s)):oxygen is from 1:1 to 1:2.

Suitably, the first metal is one or more metals selected from the group consisting of: sodium, potassium, calcium, strontium, barium, lead and cerium.

The second metal is one or more of Ru, Ir, Os, Rh (suitably Ru and/or Ir) having an oxidation state of from 3+ to 6+, including intermediate partial oxidation states. In certain crystalline metal oxides included in the invention, some of the one or more second metal is replaced by a third metal; the atomic ratio of first metal:(second metal+third metal) is from 1:1.5 to 1.5:1 and the atomic ratio of (first metal+second metal+third metal):oxygen is from 1:1 to 1:2. The third metal is suitably selected from the group consisting of: calcium, magnesium or a rare earth metal (RE, wherein RE is as hereinafter defined), indium, thallium, tin, lead, antimony and bismuth.

Alternatively, there is provided a catalyst layer comprising an electro catalyst and an oxygen evolution catalyst, wherein the oxygen evolution catalyst comprises a crystalline metal oxide of formula $$(AA')_a(BB')_bO_c.$$

wherein A and A' are the same or different and are selected from the group consisting of yttrium, lanthanum, cerium, praseodymium, neodymium, promethium, samarium, europium, gadolinium, terbium, dysprosium, holmium, erbium, thulium, ytterbium, lutetium, magnesium, calcium, strontium, barium, sodium, potassium, indium, thallium, tin, lead, antimony and bismuth; B is selected from the group consisting of Ru, Ir, Os, and Rh; B' is selected from the group consisting of Ru, Ir, Os, Rh, Ca, Mg, RE (wherein RE is as hereinafter defined), indium, thallium, tin, lead, antimony and bismuth; c is from 3-11; the atomic ratio of (a+b):c is from 1:1 to 1:2; the atomic ratio of a:b is from 1:1.5 to 1.5:1.

Suitably, A and A' are selected from the group consisting of: sodium, potassium, calcium, strontium, barium, lead and cerium.

Suitably, B is selected from the group consisting of Ru, Ir, Os, Rh (suitably Ru and Ir) having an oxidation state of from $3^+$ to $6^+$, including intermediate partial oxidation states.

Suitably, B' is selected from the group consisting of Ru, Ir, Os, Rh (suitably Ru and Ir) having an oxidation state of from $3^+$ to $6^+$, including intermediate partial oxidation states, Ca, Mg, RE (wherein RE is as hereinafter defined), indium, thallium, tin, lead, antimony and bismuth.

c is from 3-11. Since the atomic ratio of (a+b):c is known, the value of (a+b) can be determined. Similarly, since the atomic ratio of a:b and the value of (a+b) is known, the values of a and b can be determined.

Specific examples of crystalline metal oxides which may be used as the oxygen evolution catalyst include, but are not limited to: $RERuO_3$; $SrRuO_3$; $PbRuO_3$; $REIrO_3$; $CaIrO_3$; $BaIrO_3$; $PbIrO_3$; $SrIrO_3$; $KIrO_3$; $SrM_{0.5}Ir_{0.5}O_3$; $Ba_3LiIr_2O_9$; $Sm_2NaIrO_6$; $La_{1.2}Sr_{2.7}IrO_{7.33}$; $Sr_3Ir_2O_7$; $Sr_2Ir_3O_9$; $SrIr_2O_6$; $Ba_2Ir_3O_9$; $BaIr_2O_6$; $La_3Ir_3O_{11}$; $RE_2Ru_2O_7$; $RE_2Ir_2O_7$; $Bi_2Ir_2O_7$; $Pb_2Ir_2O_7$; $Ca_2Ir_2O_7$; $(NaCa)_2Ir_2O_6$; $(NaSr)_3Ir_3O_{11}$; $(NaCe)_2Ir_2O_7$; $(NaCe)_2Ru_2O_7$; $(NaCe)_2(RuIr)_2O_7$.

In the above specific examples: RE is one or more rare earth metals selected from the group consisting of: yttrium, lanthanum, cerium, praseodymium, neodymium, promethium, samarium, europium, gadolinium, terbium, dysprosium, holmium, erbium, thulium, ytterbium, lutetium; M is Ca, Mg or RE (where RE is as defined before).

DETAILED DESCRIPTION OF THE INVENTION

In one specific embodiment, crystalline metal oxides of the formula $(AA')_a(BB')O_c$. are used. In this formula: A, A', B and B' are as hereinbefore defined; a is 0.66 to 1.5, b is 1 and c is 3 to 5. These crystalline metal oxides have a perovskite type crystalline structure, as described in Structural Inorganic Chemistry: Fifth Edition, Wells, A. F., Oxford University Press, 1984 (1991 reprint). Specific examples of crystalline metal oxides with a perovskite type crystalline structure include, but are not limited to, $RERuO_3$; $SrRuO_3$; $PbRuO_3$; $REIrO_3$; $CaIrO_3$; $BaIrO_3$; $PbIrO_3$; $SrIrO_3$; $KIrO_3$; $SrM_{0.5}IrO_{0.5}O_3$ (wherein RE and M are as hereinbefore defined).

In a second specific embodiment, crystalline metal oxides of the formula $(AA')_a(BB')_2O_c$. are used. In this formula: A, A', B and B' are as hereinbefore defined; a is 1.33 to 3, b is 2 and c is 3 to 10, preferably 6-7. These crystalline metal oxides have a pyrochlore type crystalline structure, as described in Structural Inorganic Chemistry: Fifth Edition, Wells, A. F., Oxford University Press, 1984 (1991 reprint). Specific examples of crystalline metal oxides with a pyrochlore type crystalline structure include, but are not limited to, $RE_2Ru_2O_7$; $RE_2Ir_2O_7$; $Bi_2Ir_2O_7$; $Pb_2Ir_2O_7$; $Ca_2Ir_2O_7$ (wherein RE is as hereinbefore defined).

In a third specific embodiment, crystalline metal oxides of the formula $(AA')_a(BB')_3O_c$. are used. In this formula: A, A', B and B' are as hereinbefore defined; a is 2 to 4.5, b is 3 and c is 10 to 11. These crystalline metal oxides have a $KSbO_3$ type crystalline structure, as described as a cubic form with space group Pn3 in Structural Inorganic Chemistry: Fifth Edition, Wells, A. F., Oxford University Press, 1984 (1991 reprint). Specific examples of crystalline metal oxides with a $KSbO_3$ type crystalline structure include, but are not limited to, $K_3Ir_3O_9$; $Sr_2Ir_3O_9$; $Ba_2Ir_3O_9$; $La_3Ir_3O_{11}$.

In some of these compositions listed above, there may be oxygen vacancies which will reduce the oxygen stoichiometry in the crystalline structure. Similarly, some of the one or more first metal sites (or A, A' sites) may be left vacant, reducing the stoichiometry of the first metal (or A, A' metal) in the crystalline structure. Furthermore, in some instances, water molecules are known to occupy some vacant sites to provide a hydrated or partially hydrated crystalline metal oxide.

Preferably, the specific surface area (BET) of the crystalline metal oxide is greater than 20 $m^2/g$, preferably greater than 50 $m^2/g$. The determination of the specific surface area by the BET method is carried out by the following process: after degassing to form a clean, solid surface, a nitrogen adsorption isotherm is obtained, whereby the quantity of gas adsorbed is measured as a function of gas pressure, at a constant temperature (usually that of liquid nitrogen at its boiling point at one atmosphere pressure). A plot of $1/[V_a((P_0/P)-1)]$ vs $P/P_0$ is then constructed for $P/P_0$ values in the range 0.05 to 0.3 (or sometimes as low as 0.2), where $V_a$ is the quantity of gas adsorbed at pressure P, and $P_0$ is the saturation pressure of the gas. A straight line is fitted to the plot to yield the monolayer volume ($V_m$), from the intercept $1/V_mC$ and slope $(C-1)/V_mC$, where C is a constant. The surface area of the sample can be determined from the monolayer volume by correcting for the area occupied by a single adsorbate molecule. More details can be found in 'Analytical Methods in Fine Particle Technology', by Paul A. Webb and Clyde Orr, Micromeritics Instruments Corporation 1997.

The crystalline metal oxide can be made by a variety of routes, including solid state synthesis, hydrothermal synthesis, spray pyrolysis and in some cases co-precipitation. The direct solid state synthesis route involves heating stoichiometric mixtures of oxides and/or carbonates in air to high temperature, typically >800° C. Hydrothermal synthesis involves heating mixtures of appropriate starting salts and if necessary an oxidising agent at a more modest temperature (typically 200-250° C.) in a suitable sealed vessel. This method generally gives materials with much higher surface area (i.e. smaller crystallite size) than those prepared by solid state routes.

The electrocatalyst comprises a metal (the primary metal), which is suitably selected from
(i) the platinum group metals (PGM) (platinum, palladium, rhodium, ruthenium, iridium and osmium), or
(ii) gold or silver, or
(iii) a base metal
or an oxide thereof.

The primary metal may be alloyed or mixed with one or more other precious metals, or base metals or an oxide of a precious metal or base metal. The metal, alloy or mixture of metals may be unsupported or supported on a suitable inert support. In one embodiment, if the electrocatalyst is supported, the support is non-carbonaceous. Examples of such a support include titania, niobia, tantala, tungsten carbide, hafnium oxide or tungsten oxide. Such oxides and carbides may also be doped with other metals to increase their electrical conductivity, for example niobium doped titania.

The electrocatalyst and oxygen evolution catalyst may be present in the catalyst layer either as separate layers or as a mixed layer or as a combination of the two. If present as separate layers, the layers are suitably arranged such that the oxygen evolution catalyst layer is next to the membrane in the MEA. In a preferred embodiment, the electrocatalyst and the oxygen evolution catalyst are present in the catalyst layer as a mixed layer.

In an alternative embodiment of the invention, the electrocatalyst and the oxygen evolution catalyst are present in the catalyst layer as a mixed layer and the oxygen evolution catalyst acts as the support material for the electrocatalyst.

Suitably, the ratio (by weight) of the oxygen evolution catalyst to total electrocatalyst in the catalyst layer is from 20:1 to 1:20, preferably from 1:1 to 1:10. The actual ratio will depend on whether the catalyst layer is employed at the anode or cathode and whether the oxygen evolution catalyst is used as a support for the electrocatalyst.

Suitably, the loading of the primary metal of the electrocatalyst in the catalyst layer is less than 0.4 mg/cm$^2$, and is preferably from 0.01 mg/cm$^2$ to 0.35 mg/cm$^2$, most preferably 0.02 mg/cm$^2$ to 0.25 mg/cm$^2$.

The catalyst layer may comprise additional components, for example a polymer binder, such as an ionomer, suitably a proton conducting ionomer. Examples of suitable proton conducting ionomers will be known to those skilled in the art, but include perfluorosulphonic acid ionomers, such as Nafion® and ionomers made from hydrocarbon polymers.

The catalyst layer of the invention has utility in electrochemical cells, and in particular in PEM fuel cells. Accordingly, a further aspect of the invention provides an electrode comprising a gas diffusion layer (GDL) and a catalyst layer according to the invention. In one embodiment, the electrode is an anode of a conventional fuel cell. In a second embodiment, the electrode is a cathode of a conventional fuel cell.

The catalyst layer can be deposited onto a GDL using well known techniques, such as those disclosed in EP 0 731 520. The catalyst layer components may be formulated into an ink, comprising an aqueous and/or organic solvent, optional polymeric binders and optional proton-conducting polymer. The ink may be deposited onto an electronically conducting GDL using techniques such as spraying, printing and doctor blade methods. The anode and cathode gas diffusion layers are suitably based on conventional non-woven carbon fibre gas diffusion substrates such as rigid sheet carbon fibre papers (e.g. the TGP-H series of carbon fibre papers available from Toray Industries Inc., Japan) or roll-good carbon fibre papers (e.g. the H2315 based series available from Freudenberg FCCT KG, Germany; the Sigracet® series available from SGL Technologies GmbH, Germany; the AvCarb® series available from Ballard Material Products, United States of America; or the NOS series available from CeTech Co., Ltd. Taiwan), or on woven carbon fibre cloth substrates (e.g. the SCCG series of carbon cloths available from the SAATI Group, S.p.A., Italy; or the WOS series available from CeTech Co., Ltd, Taiwan). For many PEMFC and DMFC applications the non-woven carbon fibre paper, or woven carbon fibre cloth substrates are typically modified with a hydrophobic polymer treatment and/or application of a microporous layer comprising particulate material either embedded within the substrate or coated onto the planar faces, or a combination of both to form the gas diffusion layer. The particulate material is typically a mixture of carbon black and a polymer such as polytetrafluoroethylene (PTFE). Suitably the gas diffusion layers are between 100 and 300 µm thick. Preferably there is a layer of particulate material such as carbon black and PTFE on the faces of the gas diffusion layers that contact the electrocatalyst layers.

In PEM fuel cells, the electrolyte is a proton conducting membrane. The catalyst layer of the invention may be deposited onto one or both faces of the proton conducting membrane to form a catalysed membrane. In a further aspect the present invention provides a catalysed membrane comprising a proton conducting membrane and a catalyst layer of the invention. The catalyst layer can be deposited onto the membrane using well-known techniques. The catalyst layer components may be formulated into an ink and deposited onto the membrane either directly or indirectly via a transfer substrate.

The membrane may be any membrane suitable for use in a PEM fuel cell, for example the membrane may be based on a perfluorinated sulphonic acid material such as Nafion® (DuPont), Flemion® (Asahi Glass) and Aciplex® (Asahi Kasei); these membranes may be used unmodified, or may be modified to improve the high temperature performance, for example by incorporating an additive. Alternatively, the membrane may be based on a sulphonated hydrocarbon membrane such as those available from FuMA-Tech GmbH as the fumapem® P, E or K series of products, JSR Corporation, Toyobo Corporation, and others. The membrane may be a composite membrane, containing the proton-conducting material and other materials that confer properties such as mechanical strength. For example, the membrane may comprise an expanded PTFE substrate. Alternatively, the membrane may be based on polybenzimidazole doped with phosphoric acid and include membranes from developers such as BASF Fuel Cell GmbH, for example the Celtec®-P membrane which will operate in the range 120° C. to 180° C.

In a further embodiment of the invention, the substrate onto which the catalyst of the invention is applied is a transfer substrate. Accordingly, a further aspect of the present invention provides a catalysed transfer substrate comprising a catalyst layer of the invention. The transfer substrate may be any suitable transfer substrate known to those skilled in the art but is preferably a polymeric material such as polytetrafluoroethylene (PTFE), polyimide, polyvinylidene difluoride (PVDF), or polypropylene (especially biaxially-oriented polypropylene, BOPP) or a polymer-coated paper such as polyurethane coated paper. The transfer substrate could also be a silicone release paper or a metal foil such as aluminium foil. The catalyst layer of the invention may then be transferred to a GDL or membrane by techniques known to those skilled in the art.

A yet further aspect of the invention provides a membrane electrode assembly comprising a catalyst layer, electrode or catalysed membrane according to the invention. The MEA may be made up in a number of ways including, but not limited to:

(i) a proton conducting membrane may be sandwiched between two electrodes (one anode and one cathode), at least one of which is an electrode according to the present invention;

(ii) a catalysed membrane coated on one side only by a catalyst layer may be sandwiched between (a) a gas diffusion layer and an electrode, the gas diffusion layer contacting the side of the membrane coated with the catalyst layer, or (b) two electrodes, and wherein at least one of the catalyst layer and the electrode(s) is according to the present invention;

(iii) a catalysed membrane coated on both sides with a catalyst layer may be sandwiched between (a) two gas diffusion layers, (b) a gas diffusion layer and an electrode or (c) two electrodes, and wherein at least one of the catalyst layer and the electrode(s) is according to the present invention.

The MEA may further comprise components that seal and/or reinforce the edge regions of the MEA for example as described in WO2005/020356. The MEA is assembled by conventional methods known to those skilled in the art.

Electrochemical devices in which the catalyst layer, electrode, catalysed membrane and MEA of the invention may be used include fuel cells, in particular proton exchange membrane (PEM) fuel cells. The PEM fuel cell could be operating on hydrogen or a hydrogen-rich fuel at the anode or could be fuelled with a hydrocarbon fuel such as methanol. The catalyst layer, electrode, catalysed membrane and MEA of the invention may also be used in fuel cells in which the membranes use charge carriers other than protons, for example $OH^-$ conducting membranes such as those available from Solvay Solexis S.p.A., FuMA-Tech GmbH. The catalyst layer and electrode of the invention may also be used in other low temperature fuel cells that employ liquid ion conducting electrolytes, such as aqueous acids and alkaline solutions or concentrated phosphoric acid. Other electrochemical devices in which the catalyst layer, electrode, catalysed membrane and MEA of the invention may be used are as the oxygen electrode of regenerative fuel cells, and as the anode of an electrolyser where oxygen evolution is performed by the water electrolysis catalyst and contaminant hydrogen is recombined with oxygen by the electrocatalyst.

Accordingly, a further aspect of the invention provides a fuel cell, preferably a proton exchange membrane fuel cell, comprising a catalyst layer, an electrode, a catalysed membrane or an MEA of the invention.

The present invention will now be described further with reference to the following examples which are illustrative, but not limiting, of the invention.

EXAMPLE 1

$Na_{0.54}Ca_{1.18}Ir_2O_6 \cdot 0.66H_2O$

To a 22 ml volume autoclave, 8 ml of 10 M NaOH solution, 0.5 ml of de-ionised water, 0.250 g ($1.06 \times 10^{-3}$ mole) $Ca(NO_3)_2$ and 0.411 g ($1.06 \times 10^{-3}$ mole) $IrCl_3$ was added and stirred for 1 hour. 0.174 g ($2.23 \times 10^{-3}$ mole) $Na_2O_2$ was added to the reaction solution and stirred for another 10 minutes; then the same weight $Na_2O_2$ was added again before closing the autoclave. The autoclave was heated at 240° C. for 96 hr in an oven. The autoclave was cooled to room temperature. The reaction mixture was transferred to a beaker and left to settle. The solution was decanted leaving the precipitate, rinsed with de-ionised water and repeated several times. The precipitate was then similarly washed with excess 1M $H_2SO_4$ then with de-ionised water and dried to yield a black powder.

At 240° C., maximum pressure generated inside the autoclave was not more than 51 bar. ($H_2O$ vapour pressure of Water=34 bar+decomposition of all $Na_2O_2$=17 bar maximum).

An alternative preparation may add concentrated $H_2O_2$ dropwise while stirring instead of $Na_2O_2$ addition and/or may use solid NaOH in place of prepared NaOH solution. Before any peroxide compound is added all other reagents are well-mixed.

The following Examples were prepared by a similar method:

| Example No. | Composition | Reagents | Autoclave conditions |
|---|---|---|---|
| Example 1 | $Na_{0.54}Ca_{1.18}Ir_2O_6 \cdot 0.66H_2O$ | $1Ca(NO_3)_2 \cdot 4H_2O$ + $1IrCl_3 \cdot 7H_2O$ + 8 ml 10M NaOH + $4.2Na_2O_2$ + 0.5 ml $H_2O$ | 240° C. 96 hours |
| Example 2 | $Bi_2Ir_2O_7$ | $1NaBiO_3$ + $1.25IrCl_3 \cdot 7H_2O$ + 8 ml 5M NaOH + $8Na_2O_2$ | 240° C. 120 hours |
| Example 3 | $Pb_2Ir_2O_7$ | $1Pb(NO_3)_2$ + $1IrCl_3 \cdot 7H_2O$ + 6 ml $H_2O$ + $2Na_2O_2$ + NaOH | 240° C. 112 hours |
| Example 4 | $Na_{0.8}Sr_{2.2}Ir_3O_{10.1}$ | $0.75Sr(NO_3)_2$ + $1IrCl_3 \cdot 7H_2O$ + 100NaOH + 3 ml $H_2O$ + 10 µl conc HF + 6 ml conc $H_2O_2$ | 240° C. 72 hours |
| Example 5 | $Na_{0.66}Ce_{1.34}Ru_2O_7$ | $0.66CeCl_3 \cdot 7H_2O$ + $1RuCl_3 \cdot nH_2O$ + 5M NaOH + $10Na_2O_2$ | 225° C. 120 hours |
| Example 6 | $Na_{0.66}Ce_{1.34}Ir_2O_7$ | $0.66CeCl_3 \cdot 7H_2O$ + $1 IrCl_3 \cdot 7H_2O$ + 5M NaOH + $10Na_2O_2$ | 240° C. 120 hours |
| Example 7 | $Na_{0.66}Ce_{1.34}Ru_{0.6}Ir_{1.4}O_7$ | $0.66CeCl_3 \cdot 7H_2O$ + $0.3RuCl_3 \cdot nH_2O$ + $0.7IrCl_3 \cdot 7H_2O$ + 5M NaOH + $10Na_2O_2$ | 225° C. 120 hours |
| Example 8 | $Na_{0.54}Ca_{1.18}Ir_2O_6 \cdot 0.66H_2O$ | $1Ca(NO_3)_2 \cdot 4H_2O$ + $1IrCl_3 \cdot 7H_2O$ + 22 ml 10M NaOH + $4.2Na_2O_2$ + 0.5 ml $H_2O$ | 240° C. 70 hours |

COMPARATIVE EXAMPLE 1

An unsupported $RuO_2/IrO_2$ mixed oxide with a nominal Ru:Ir atomic ratio of 90:10.

COMPARATIVE EXAMPLE 2

A TaIr mixed oxide was prepared in accordance with the preparation of Example 2 of WO2011/021034.

Typical Powder Characterisation/Analysis

Samples were analysed by BET to determine surface area. A sample typically was degassed at 200° C. for 15 hrs under $N_2$ flow before $N_2$ adsorption BET surface area measurement was determined. Moisture content and thermal stability was determined by DSC. Elemental composition was determined via ICPES. Samples were analysed by XRD to identify crystallographic parameters.

Sample chemical composition was refined based on modelling powder neutron diffraction data obtained using the POLARIS diffractometer at ISIS (R. Walton et al. Chem. Sci., 2011, 2, 1573). The XRD data was used to obtain a starting crystal structure from which peak intensities were matched in order to identify the fractional A and A' content in an $(AA')_a(BB')_bO_c$ structure. A crystal structure with inclusive water accounted for evident moisture from DSC data. The refined chemical composition was compared against ICPES elemental data.

Ink, Catalyst Layer and MEA Preparation 65 mg of the crystalline metal oxide example of the invention was added to a 5 ml vial with 1.7 mL $H_2O$. The mixture was processed with a high intensity ¼ cm microtip ultrasonic probe for 2 minutes at 3W. The mixture was added to 0.65 g of HiSPEC® 18600 (Johnson Matthey PLC) catalyst in a separate container. The vial was rinsed three times with 350 µL de-ionised $H_2O$ and added to the container with the catalyst. The catalyst slurry was mixed manually with a spatula to wet all material, then mixed at 3000 rpm in a planetary mixer for 3 minutes. The mixed catalyst was dried at 80° C. in a fan-assisted oven.

The dried catalyst was broken into a powder, aqueous Nafion® solution (available from DuPont) was added to dried mixed-catalyst and the ink was shear-mixed in a planetary mixer using 5 mm YSZ ceramic beads. After having mixed for 3 minutes at 3000 rpm the ink was stirred manually with a spatula to break up any sediment. The ink was further milled for 5 minutes.

The ink was screen-printed onto a PTFE sheet to give a layer having a targeted PGM loading of 0.1 $mg/cm^2$. The layer was transferred from the PTFE (polytetrafluoroethylene) sheet onto a Nafion® N112 membrane (available from DuPont) at 150° C. with pressure. A Pt/C layer was transferred to the opposite side of the N112 membrane simultaneously in order to produce a catalyst coated membrane (CCM).

Fuel Cell Testing

The CCM was assembled in the fuel cell hardware using Toray TGP-H-060 as the gas diffusion substrate, coated with a PTFE/carbon coating to form the gas diffusion layer. The fuel cell was tested at 80° C. and 10 psig with humidified $H_2/N_2$ gas reactants. The oxygen evolution mass activity of the mixed catalyst layer was determined at 1.5V vs RHE by scanning the potential from 20 mV to 1.6V at 5 mV/s. The results are shown in Table 1.

TABLE 1

| Example No. | $O_2$ Evolution Catalyst PGM Loading µg/$cm^2$ | Apparent $M_{act}$ (1.5 V) A/g PGM | BET $m^2$/g |
|---|---|---|---|
| Comparative Example 1 | 18.3 | 334 | 8 |
| Comparative Example 2 | 13.9 | 291 | 45 |
| Example 1 | 11.8 | 3051 | 68 |
| Example 2 | 8.1 | 4717 | 42 |
| Example 3 | 8.8 | 2500 | 18 |
| Example 4 | 10.6 | 1322 | 38 |
| Example 5 | 9.9 | 17458 | 50 |
| Example 6 | 10.5 | 2279 | 87 |
| Example 7 | 8.3 | 4530 | 91.5 |
| Example 8 | 10.7 | 1186 | 28 |

From the data it can be seen that the MEAs having the catalyst layers of the invention have a far higher oxygen evolution mass activity than the Comparative Examples.

The invention claimed is:

1. A catalyst layer comprising:
   an electrocatalyst comprising platinum; and
   an oxygen evolution catalyst,
   wherein the oxygen evolution catalyst comprises a crystalline metal oxide of formula $(AA')_a(BB')_bO_c$, the crystalline metal oxide having a pyrochlore type crystalline structure,
   wherein A and A' are the same or different and are selected from the group consisting of yttrium, lanthanum, cerium, praseodymium, neodymium, promethium, samarium, europium, gadolinium, terbium, dysprosium, holmium, erbium, thulium, ytterbium, lutetium, magnesium, calcium, strontium, barium, sodium, potassium, indium, thallium, tin, lead, antimony and bismuth;
   B is selected from the group consisting of Ru, Ir, Os, and Rh;
   B' is selected from the group consisting of Ru, Ir, Os, Rh, Ca, Mg or a rare earth metal;
   a is 1.33 to 3;
   b is 2;
   c is from 3 to 10;
   the atomic ratio of (a+b) : c is from 1:1 to 1:2; and
   the atomic ratio of a:b is from 1:1.5 to 1.5:1, and,
   wherein the electrocatalyst and the oxygen evolution catalyst are present in said layer as a mixture.

2. An electrode comprising a gas diffusion layer and the catalyst layer of claim 1.

3. A catalysed membrane comprising a proton conducting membrane and the catalyst layer of claim 1.

4. A catalysed transfer substrate comprising the catalyst layer of claim 1.

5. A membrane electrode assembly comprising the catalyst layer of claim 1.

6. The catalyst layer of claim 1, wherein A and A' are the same or different and are selected from the group consisting of sodium, potassium, calcium, strontium, barium lead, and cerium.

* * * * *